United States Patent Office 3,535,297
Patented Oct. 20, 1970

3,535,297
POLYMERIZATION OF ETHYLENE USING SUPPORTED ACTIVATED CHROMYL CHLORIDE CATALYSTS
Wayne L. Carrick, East Brunswick, N.J., and Adrian S. Fox, Sunnyvale, Calif., assignors to Union Carbide Corporation, a corporation of New York
No Drawing. Filed Feb. 14, 1968, Ser. No. 705,309
Int. Cl. C08d 3/04
U.S. Cl. 260—85.3                                    15 Claims

ABSTRACT OF THE DISCLOSURE

Supported activated chromyl chloride catalysts, which are formed when chromyl chloride adsorbed on a support is activated with a suitable reducing agent (such as an organoaluminum compound), have been found to be unusually effective catalysts for the polymerization of ethylene over a wide range of reaction conditions and may be used to produce polyethylene, interpolymers of ethylene and other α-olefins and interpolymers of ethylene and diolefins. By polymerizing ethylene in the presence of a supported activated chromyl chloride catalyst, preferably using hydrogen, it is possible to produce normally solid, high molecular weight polyethylene having a predetermined melt index.

INTRODUCTION

This invention relates to the polymerization of ethylene to form either polyethylene, interpolymers of ethylene and other α-olefins, or interpolymers of ethylene and diolefins. The invention is based on the discovery that supported activated chromyl chloride catalysts, which are the reaction products of (a) chromyl chloride adsorbed on an insoluble, inorganic support having a high surface area, and (b) organoaluminum compounds containing up to two oxyhydrocarbyl groups attached to the aluminum atom, are unusually effective catalysts for the polymerization of ethylene. The invention provides an improved process for the polymerization of ethylene by which it is possible to produce high molecular weight polyethylene that is commercially desirable for molding and extrusion applications, particularly for wire coating. The invention also provides supported activated chromyl chloride catalysts for the polymerization of ethylene.

SUMMARY OF THE INVENTION

By itself, chromyl chloride is incapable of initiating the polymerization of ethylene, regardless of whether the chromyl chloride is adsorbed on an inert support or dissolved or suspended in a solvent. When chromyl chloride is adsorbed (or "deposited," the two terms being used interchangeably) on an insoluble, inorganic material having a high surface area, and the supported chromyl chloride is activated by reaction with an organoaluminum reducing agent, preferably one having at least 1 and not more than 2 oxyhydrocarbyl groups attached to the aluminum atom, the resultant supported activated chromyl chloride has been found to be an unusually effective catalyst in the absence of moisture and of air for the polymerization of ethylene over a wide range of reaction conditions. By polymerizing ethylene in the presence of a supported activated chromyl chloride catalyst, it is possible to produce either polyethylene, interpolymers of ethylene and other α-olefins, or crosslinkable interpolymers of ethylene and diolefins.

Based on these discoveries, the invention provides an improved process for the polymerization of ethylene which comprises contacting ethylene, at a temperature and at a pressure sufficient to initiate the polymerization reaction, with a catalytic amount of the reaction product of (a) chromyl chloride adsorbed on an insoluble, inorganic support having a high surface area, and (b) an organoaluminum compound sufficient to reduce part of the chromium to a valence state of +2 and preferably compounds having at least 1 and not more than 2 oxyhydrocarbyl groups attached to the aluminum atom. The invention also contemplates a catalyst for the polymerization of ethylene comprising the reaction product of (a) chromyl chloride adsorbed on an insoluble, inorganic support having a high surface area, and (b) the organoaluminum compound.

THE BASIC PARAMETERS OF THE PROCESS

The process of the invention may be more fully understood by a discussion of (a) the formation of the supported activated chromyl chloride catalyst, and (b) the polymerization of ethylene by contact of the monomer with a catalytic amount of the supported activated chromyl chloride catalyst at a temperature and at a pressure sufficient to initiate the polymerization reaction.

The catalyst

Chromyl chloride ($CrO_2Cl_2$) is a red liquid (B.P. 116.7° C.) which may be prepared by a variety of methods, the most common of which is distillation from a mixture of concentrated sulfuric acid, anhydrous sodium chromate or dichromate, and sodium chloride. Chromyl chloride is soluble without decomposition in carbon tetrachloride, nitrobenzene, antimony pentachloride, and similar liquids, but is rapidly hydrolyzed by water, which requires that the compound be carefully handled during preparation of the supported catalyst.

To prepare supported activated chromyl chloride for use as an ethylene polymerization catalyst, chromyl chloride is contacted with a substantially anhydrous, insoluble, inorganic material having a high surface area under conditions such that the chromyl chloride is adsorbed on and supported by the insoluble, inorganic material. Among the various inorganic materials which may be used as the catalyst support are silica, alumina, silica-alumina mixtures, thoria, zirconia, and comparable oxides. To be effective, these supports must have a high surface area to adsorb a sufficient quantity of the chromyl chloride and provide sufficient contact between the activated chromyl chloride catalyst and the monomer. As a general rule, inorganic oxides having a surface area in the range from about 50 to about 1000 square meters per gram should be employed as the catalyst support. The particle size of these supports is not particularly critical, however, provided that the support has a high surface area.

Because chromyl chloride is sensitive to moisture, the catalyst support should be completely dried before it is brought into contact with the chromyl chloride. This is normally done by simple heating or pre-drying the catalyst support with an inert gas prior to use. Surprisingly, however, it has been found that the temperature of drying has an appreciable effect on the relative productivity of the catalyst system and on the molecular weight distribution and the melt index of the polymer produced.

Drying or activation of the support can be accomplished at nearly any temperature up to about the sintering temperature for a period of time at least sufficient to remove the adsorbed water but avoiding contact which will remove all the chemically bound water. Desirably, an inert gas stream through the support during the drying aids in the displacement. Temperatures of from about 200°C. to 900°C. for a short period of about six hours or so should be sufficient if a well dried inert gas is used and the temperature not be permitted to get so high as to remove the chemically bound hydroxyl groups on the surface of the support.

Any grade of support can be used herein but the intermediate density silica having a surface area of at least 200 square meters per gram and a large pore diameter is preferred for the higher melt index resins. The ID silica or the MSID silica of a pore diameter of about 164 A. to about 288 A. are highly satisfactory. Other grades of silica and silica-alumina, such as those provided by W. R. Grace and Co., having surface areas of 700 and 500 square meters per gram respectively, and pore diameters of 50-70 A. are also quite satisfactory. Variations in melt index control and in polymer productivity can be expected between different grades of supports.

To form the active catalyst, the supported chromyl chloride is reacted with organoaluminum reducing agents having at least 1 hydrocarbyl group and not more than 2 oxyhydrocarbyl groups attached to the aluminum atom. The preferred organoaluminum compounds are those represented by the formula

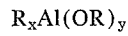

$$R_xAl(OR)_y$$

in which $x$ and $y$ are integers from 1 to 2 inclusive and together total 3, and R is a hydrocarbyl group containing from 1 to about 14 carbon atoms. The R hydrocarbon group is not critical and can be any selected hydrocarbon group such as alkyl, aralkyl, aryl, alkaryl, alicyclic, bicylic and like hydrocarbons. Illustrative thereof are methyl, ethyl, propyl, iso-propyl, n-butyl, iso-butyl, n-pentyl, iso-pentyl, t-pentyl, hexyl, cyclohexyl, 2-methylpentyl, heptyl, octyl, 2-ethylhexyl, cyclohexylmethyl, nonyl, decyl, undecyl, dodecyl, tridecyl, tetradecyl, benzyl, pinyl, pinylmethyl, phenethyl, p-methylbenzyl, phenyl, tolyl, xylyl, naphthyl, ethylphenyl, methylnaphthyl, dimethylnaphthyl, norbornyl, norbornyl methyl or any such similar hydrocarbyl groups. Those R groups directly bonded to the aluminum atom containing from 1 to 8 carbon atoms are the least expensive and most readily available of these compounds. Obviously the R groups can be the same or different. Although trialkyl aluminum compounds can be used alone as cocatalysts, they function in this manner with reduced effectiveness and are not desired.

The one or two oxyhydrocarbyl groups also attached to the aluminum atom are obtained preferably by direct interaction between the hydrocarbon alcohol or phenol corresponding to the desired oxyhydrocarbyl groups and an aluminum trihydrocarbon corresponding to the hydrocarbyl group desired in the compound. The interreaction is rapid and complete upon simple admixture of the stoichiometric amount of the alcohol. No catalyst or heating is required.

If desired, the oxyhydrocarbyl aluminum compounds can even be generated in situ in the system by the presence of a small but stoichiometrically calculated amount of the desired alcohol with the trihydrocarbyl aluminum immediately prior to the polymerization as hereinafter shown.

While it is obviously contemplated from the above that aryl and hydrocarbon substituted aryl moieties can be present as the OR group of the aluminum compound, we would prefer to refer hereinafter to these compounds as "aluminum alkoxides" because of ease of nomenclature. Thus in all situations hereinafter, reference to the aluminum alkoxide is intended to include all of the above-identified materials coming within the scope of the above description.

Practically speaking, there are only several trihydrocarbyl aluminum compounds of significance commercially, although a larger number are available in small experimental quantities. Only triethyl aluminum, triisobutyl aluminum, and tri-n-propyl aluminum are of commercial use as to be available now in large amounts. Of these, the triethyl aluminum is preferred, although it should not be implied or assumed that for specific desired end results, other hydrocarbyl aluminum compounds may not be otherwise more desirable.

The oxyhydrocarbyl or alkoxide moiety of these compounds imparts a much greater effect in the process and in the control of polymer molecular weight than does the hydrocarbyl moiety. Depending on the size, nature and character of the alkoxide, different results can be expected. There is provided here, differing degrees of control of melt index by the particular section of the alkoxide cocatalyst. For example, diethylaluminum phenoxide is substantially more effective for producing higher melt index polyethylenes than is the diethylaluminum ethoxide and the diethylaluminum methoxide produces a lower melt index polymer. The diethylaluminum cyclohexanemethoxide even provides a lower melt index polymer of a much narrower molecular weight distribution of the polymer. This alkoxide is particularly preferred in a copolymerization of two or more olefins.

It has also been found that dialkyl aluminum monoalkoxides are more effective than are the dialkoxides in that higher rates of polymerization are thereby secured. Aluminum trialkoxides are so nearly insoluble as to be inoperative by themselves but when disproportioned with an aluminum alkyl into a monoalkoxide or a dialkoxide, they can be used as the source of the oxyhydrocarbyl compounds used herein. In like manner the dialkoxides can be disproportioned with aluminum alkyls into a mixture containing the monoalkoxide.

Thus it is seen that in this invention any desired combination of alkoxide and hydrocarbon groups attached to the aluminum atom is possible. Most particularly preferred of these compounds is the diethyl-aluminum ethoxide in that a very highly active catalyst is formed producing a higher melt index of polymer. This permits production of 10.0 melt index polyethylene even in a slurry process and provides a substantial economic advantage over other low pressure polymerization processes where other physical treatment of the polymer is necessary to obtain practically useful melt indices.

The amount of the aluminum alkoxide is not narrowly critical and need only be sufficient to reduce a portion of the chromyl chloride to the active catalytic form. Even amounts as low as about 0.2 mole of the aluminum alkoxide per mole of the chromyl chloride can be used, although we prefer amounts greater than equimolar. Even more particularly, we prefer amounts from about 5 to 20 moles or more per mole of chromyl chloride. Little additional benefit is obtained in rate or yield by use of greater amounts but excess alkoxide is not harmful in the process. It is possible to also employ other reducing agents with the alkoxide, if desired, such as zinc dihydrocarbons or aluminum trihydrocarbons and particularly aluminum trialkyls. Thus, even mixtures of aluminum alkoxides and aluminum alkyls can be employed and still secure the benefits of this invention.

The use of the aluminum alkoxides alone as the reducing agent is most preferred in this invention in that polymers having the lowest intrinsic viscosity ($\eta$) at a given melt index or number average molecular weight are produced. This means that the molecular weight distribution of the polymer is narrower and is relatively free of higher molecular weight "tails" or fragments of extreme weight that will influence adversely the extrusion characteristics of the polymer.

However, the subsequent treatment of the supported chromyl chloride with a small amount of another promoter, such as an aluminum trihydrocarbon after the exposure to the aluminum alkoxide, or even conjointly with it, sometimes improves the polymerization rate and yield of polymer.

This improvement in rate and yield may well be due to the activity of the organoaluminum or organozinc compound acting as a scavenger for impurities in the system since essentially equivalent rates and yields are secured when the aluminum alkoxides are used along with highly purified reagents. Such metal hydrocarbons as used for purposes of this invention whatever their real function may be, includes compounds of the formula $R_yMeX_z$ where R is a hydrocarbyl radical having from 1 to 14 carbon atoms, Me is an amphoteric metal such as aluminum or zinc, X is a halogen or hydrogen and y is an integer from 2 to 3, inclusive and z is an integer from 0 to 1, inclusive, the sum of y and z being equal to the valence of the metal Me. Preferred are the metal lower alkyls as exemplified by triethylaluminum, tri-iso-butylaluminum, trioctyaluminum, dibutylaluminum bromide, diethylaluminum chloride, diethyl aluminum hydride, butylaluminum dichloride, zinc diethyl, zinc di-iso-propyl, and the like. However, since their use is not an essential part of this process or in the catalyst system employed, the amount used is not critical. We use them generally in minor amounts compared to the aluminum alkoxide, i.e., from about 0.1 mole or so up to about 1 mole per mole per part of the alkoxide.

*Polymerization conditions*

After the supported activated chromyl chloride catalysts have been formed, the polymerization reaction is conducted by contacting ethylene, substantially in the absence of moisture and of air, with a catalytic amount of the supported activated chromyl chloride catalyst at a temperature and at a pressure sufficient to initiate the polymerization reaction. If desired, an inert organic solvent may be used as a diluent and to facilitate materials handling.

The polymerization reaction is carried out at temperatures of from about 30° C. or less up to about 200° C. or more, depending to a great extent on the operating pressure, the pressure of other olefin monomers, the particular catalyst and its concentration. Naturally, the selected operating temperature is also dependent upon the desired polymer melt index since temperature is definitely a factor in adjusting the molecular weight of the polymer. Preferably, the temperature is from about 30° C. to about 100° C. in the slurry or "particle forming" technique and from 100° C. to 200° C. in "solution forming." The control of temperature in this process is desirable as hereinafter more fully described in providing various effects upon molecular weight of the polymers as well as in controlling the phase in which they are made. As with most catalyst systems, the higher temperatures produce the lower weight average molecular weight polymers, and consequently of higher melt index. In fact, by operating at the higher polymerization temperatures, polymers of a melt index of 100 to 1000 or more are possible and can be characterized as waxes, even though still of high density.

Regardless of whether the "particle forming" low temperatures or "solution forming" high temperatures are employed, a unique faculty of this catalyst system is the ability to carry out the polymerization to very high polymer solids, substantially higher than that obtainable with any other catalyst system without fouling of the equipment.

The pressure can be any pressure sufficient to initiate the polymerization of the monomer to high polymer and can be carried out from subatmosphereic pressure, using an inert gas as diluent, to superatmospheric pressure up to about 1,000,000 p.s.i.g. or more, but the preferred pressure from atmospheric up to about 1000 p.s.i.g. As a general rule, pressure of 20 to 800 p.s.i.g. is preferred. However, as can be seen from the discussion and the appended examples, a wide latitude of pressures can be employed to secure the high polymers The inert organic solvent medium when employed in this invention is not narrowly critical but it should be inert to the supported activated chromyl chloride catalyst and olefin polymer produced and stable at the reaction temperature used. It is not necessary, however, that the inert organic solvent medium serve also as a solvent for the polymer produced. Among the inert organic solvents applicable for such purpose may be mentioned saturated aliphatic hydrocarbons, such as hexane, heptane, pentane, isooctane, purified kerosene and the like, saturated cycloaliphatic hydrocarbons, such as cyclohexane, cyclopentane, dimethylcyclopentane and methylcyclopentane and the like, aromatic hydrocarbons such as benzene, toluene, xylene, and the like, and chlorinated hydrocarbons, such as chlorobenzene, tetrachloroethylene, orthodichlorobenzene, and the like. Particularly preferred solvent media are cyclohexane, pentane, hexane and heptane.

When it is desired to conduct the polymerization to a high solids level as hereinbefore set forth, it is of course desirable that the solvent be liquid at the reaction temperature. For example, operating at a temperature less than the solution temperature of the polymer in the solvent, the process can be essentially a slurry or suspension polymerization process in which the polymer actually precipitates out of the liquid reaction medium and in which the supported activated chromyl chloride catalyst is suspended in a finely divided form.

This slurry system is of course dependent upon the particular solvent employed in the polymerization and its solution temperature of the polymer prepared. Consequently, in the "particle form" embodiment, it is most desirable to operate at a temperature less than the normal solution temperature of the polymer in the selected solvent. As for example, polyethylene prepared herein has a solution temperature in cyclohexane of about 90° C. and whereas in pentane its solution temperature is about 110° C. It is characteristic of this "particle form" polymerization system that the high polymer solids content is possible even at low temperatures provided agitation is present to enable adequate mixing of the monomer with the polymerizing mass. It appears that while the polymerization rate may be slightly slower at the lower temperatures, the monomer is more soluble in the solvent medium thus counteracting any tendency to low rates and/or low yields.

It is also characteristic that the monomer appears to have substantial solubility characteristics even in the solids portion of the slurry so that as long as agitation is provided and polymerization temperature maintained, a broad range of size of solid particles in the slurry can be provided. Experience has shown that the slurry technique can produce better than fifty percent solids system, provided sufficient fluidizing conditions and agitation is maintained. It is particularly preferable to operate the slurry process in the range of 30–40 weight percent of polymer solids.

Further, a substantial feature of this process is the complete absence of the so-called "ivory" or high polymer build up on the walls and agitators of the polymerization unit, a problem characteristic of many other polymerization techniques.

Recovery of the polymer from the solvent medium is in this embodiment simplified to a simple filtration and drying operation and no efforts need be expended in polymer clean up and catalyst separation or purification. The residual concentration of catalyst in the polymer is so small, that generally less than two to three parts of chromium per million parts of polymer can be achieved, and at such levels they are innocuous and unnoticed in the polymer. Expeditiously, they can be left in the polymer.

Operating at temperatures higher than the solution temperature of the polymer in the selected solvent medium also can produce a high polymer solids content in solution. The temperature in this embodiment must be sufficiently high to enable the solvent being used to dissolve at least 25–30 percent by weight of the polymer. On the other hand, the temperature must be sufficiently low to avoid thermal destruction of the formed polymer and the particular organoaluminum-reduced chromyl chloride catalyst employed. In general, for the various solvents and supported activated chromyl chloride catalyst used, temperatures within the range of about 100° C. to about 200° C. and preferably about 120° C. to about 170° C. have been found to be generally optimum for the practice of such solution polymerization. However, the particular polymer being produced also has a significant effect on the optimum temperature. For example, ethylene-propylene copolymers produced by this process are soluble in many of these organic solvents at low temperatures and hence the use of such temperatures is permissible in this invention even though such temperatures may not be desired or optimum for producing polyethylene homopolymers or copolymers.

Solvents constitute one of the most significant and vexing sources of catalyst poisoning. Moreover, in prior solution polymerization processes employing transition metal-containing catalysts, the use of large quantities of solvent, i.e., a solvent-to-polymer ratio of the order of 20:1, was believed necessary. Such large proportions of solvent necessarily greatly increased the catalyst poisoning problem. In the present process, however, the proportion of solvent to polymer can be as low as 1:1 or even less, thereby maintaining very high catalyst productivity and efficiency of the system.

When the solvent serves as the principal reaction medium, it is of course desirable to maintain the solvent medium substantially anhydrous and free of any possible catalyst poisons, by redistilling or otherwise purifying the solvent before use in this process. Treatment with an absorbent such as high surface area silicas, alumina, molecular sieves and like materials are beneficial in removing trace amounts of contaminants that may reduce the polymerization rate or poison the catalyst during reaction.

However, it is also possible to operate the polymerization reaction without an added solvent reaction medium, if desired. For example, the monomer itself can be the reaction medium, either with the normally liquid monomers as in making ethylene-propylene copolymers using liquefied propylene and other similar normally liquid monomers or by operating under sufficient pressure that a normally gaseous monomer is liquefied.

The fact that polymerization rate remains high even at the high viscosities encountered at high solids level, is unexpected. It is particularly surprising and unexpected that the reaction rate remains high when gaseous monomers such as ethylene and propylene are employed. We have found, however, that high polymerization rates are maintained even when using these gaseous monomers at pressures under 100 p.s.i.g. when the reaction solution is agitated by means of a high velocity, high shear stirrer, particularly one driven at speeds in excess of 2000 r.p.m. and designed to impart considerable shearing action on the solution.

Another particularly important advantage afforded by the present process is that the high solids content polymer solution upon completion of the polymerization reaction is, without any further treatment, suitable for polymer isolation, by milling techniques, such as those described in U.S. 2,434,707 to W. A. Marshall. The "Marshall mill" is operated most advantageously when the polymer-solvent mixture being treated is high in polymer content. The use of such an enclosed mill also permits the recycle of all or part of the separated solvent to the polymerization reactor without contact with oxygen or atmospheric water vapor which are destructive of many transition metal-containing catalysts.

Still another advantage of having the polymer soluble in the diluent is that high reaction temperatures can be employed. This is advantageous because the high temperatures reduce the viscosity of the solution, they also cause the polymerization to proceed faster, and allow more efficient removal of the heat of reaction because of the large temperature differential between the reactor and the cooling water, and also permit control of the polymer molecular weight since high reaction temperatures generally cause the formation of lower molecular weight polymer. This latter factor is particularly important in the production of waxes of high melt index as is demonstrated hereafter in the appended examples.

The separation of polymer from the solvent medium is not limited in this invention to the use of a high shear mill, although a Marshall mill has been found to be well suited for use herein and is preferred. However, it is also possible to employ precipitation and filtration techniques to recover the polymer, or to concentrate the polymer/solvent mass by flash evaporation or other means of solvent removal followed by high shear milling. A number of other suitable high shear mills are commercially available and, because of the low solvent content of the solution to be treated, other devices such as vented extruders, calendering roll mills, planetary rotor mills such as the one described in U.S. 3,075,747 to W. L. Calvert, Banbury mills and the like can also be successfully employed to accomplish isolation of the polymer product. By the term "high shear mill" as used hereinafter is meant a mill comprising parallel rolls having intermeshing threads, and the term "high shear conditions" and "conditions of high shear" mean those conditions achieved on a high shear mill or by adequately powered high speed mixers for viscous materials.

It should be understood that the high solids system can be employed with the catalyst suspended in the solvent, provided that the necessary conditions of agitation, pressure, temperature, and the like are maintained so to provide contact of the monomer with the catalyst, and that the pressure and temperature are such as to initiate the polymerization of that monomer to the polymer.

It should also be understood that the invention herein contemplated, includes the techniques of fluidizing the solid catalyst bed in a gaseous system and contacting it with a gaseous olefin feed thereby eliminating the use of liquid solvents and the attendant problems of solvent separation and catalyst poisons as hereinbefore mentioned.

The concentration of supported activated chromyl chloride catalyst employed in this invention is not critical and primarily only affects the rate and yield of polymer secured. It can be varied from about 1 to 25,000 parts per million of catalyst, based on the weight of olefin charged. Preferably and for greatest economy of operation, the catalyst concentration is maintained from about 5 to 500 parts per million. Obviously, the lower the impurity level in the reaction system, the lower the catalyst concentration that can be used. Experience has shown that yields greater than 70,000 parts of polymer per part of activated chromyl chloride may be obtained. In such catalysts, the weight of the support is generally from 10 to 100 times the weight of the chromyl chloride. However, this ratio is not critical and can be widely varied.

Among the $\alpha$-olefins which can be polymerized with ethylene in accordance with the invention are those containing from 3 to about 10 carbon atoms. Illustrative thereof but not limiting are propylene, butene-1, pentene-1, 3-methylbutene-1, hexene-1, 4-methylpentene-1, heptene-1, octene-1, decene-1, 4,4-dimethylpentene-1, 4,4-diethylene-1, 4 - butyl - 1 - octene, 5 - ethyl-1-decene, and the like. Such compound can be polymerized on combination with a major amount of ethylene to yield normally solid, high molecular weight interpolymers of ethylene and one or more $\alpha$-olefins. Ethylene (alone or with minor amounts of other $\alpha$-olefins) may also be polymerized with a diolefin to yield normally solid, crosslinkable interpolymers. Among the diolefins which may be used are butadiene, 1,5-hexadine, dicyclopentadine, ethylidenenorbornene, and the like. Polyethylene is the particularly preferred homopolymer. Preferred interpolymers are those containing a major proportion of interpolymerized ethylene along with a minor proportion of any other monomer copolymerizable therewith. The particularly preferred interpolymers are ethylene-propylene or ethylene-butene interpolymers, having up to about 20 weight per cent of the interpolymerized propylene or butene.

Care should be taken during the polymerization to avoid the introduction of moisture, air and oxygen, all of which are catalyst poisons.

By conducting the polymerization reaction in the presence of hydrogen, which appears to function as a chain transfer agent, the molecular weight of the polymer may be controlled.

Experience has shown that hydrogen may be used in the polymerization reaction in amounts varying between about 0.001 to about 10 moles of hydrogen per mole of ethylene. For most polymerization reactions, the commercially useful molecular weights may be obtained by using from about 0.01 to about 0.5 mole of hydrogen per mole of ethylene. Stated another way, the preferred range of hydrogen is from about 0.001 to about 5 mole percent, based on the total reactor contents.

minutes at 35° C., the particular organoaluminum compound shown in Table I were added to the system to activate the supported chromyl chloride. Following the preparation of the catalyst the polymerization was carried out at the temperature indicated in Table I, using 300 p.s.i.g of ethylene. After the period stated in Table I, the reactor was vented, and the yield and properties of the polyethylenes recorded.

Analysis of the data summarized in Table I shows that supported activated chromyl chloride is an extremely active catalyst for the polymerization of ethylene under the slurry process conditions. Good yields of polymer with a reasonable molecular weight distribution were obtained with diethylaluminum ethoxide/triethyl aluminum or with diethylalumnium ethoxide as the cocatalyst. By using diethyl cyclohexylmethoxide as the cocatalyst, an active system was obtained which produces higher molecular weight polymer.

TABLE I.—CHROMYL CHLORIDE CATALYZED POLYMERIZATION OF ETHYLENE VIA A SLURRY PROCESS

| Example No. | $CrO_2Cl_2$ (mmoles) | $Et_3Al$ (mmoles) | $Et_2AlOEt$ (mmoles) | $C_6H_{11}CH_2OAlEt_2$ (mmoles) | Temp. (° C.) | Yield (g./hr.) | Melt index IP | Melt index 10P | Percent die swell |
|---|---|---|---|---|---|---|---|---|---|
| 1 | 0.0173 | 0.066 | 0.120 | | 92 | 204/1.5 | 0.42 | 37.2 | 122 |
| 2 | 0.0194 | | 0.264 | | 96 | 204/1.25 | 0.60 | 45.6 | 133 |
| 3 | 0.0171 | | | 0.198 | 91 | 90/1.5 | 0.048 | 5.40 | 75.4 |
| 4 | 0.0381 | | | 0.264 | 95 | 107/1.25 | 0.18 | 24.0 | 83.4 |
| 5 | 0.0171 | 0.216 | | | 89 | 14/1.5 | 0.021 | 2.1 | 21.2 |

EXAMPLES

The following examples are illustrative of the ease with which ethylene may be polymerized using a supported activated chromyl chloride catalyst in accordance with the invention. In each of these examples, the melt index (MI) of the polymer was measured by ASTM Test Method D-1238-62T, and the high load melt index (HLMI) was determined by the same test method, but with 440 p.s.i.g. (10-P) load on the ram of the melt indexer instead of 44 p.s.i.g. (1-P) pressure as required by the standard test method. Each of the polymerizations described below was carried out in a stainless steel, 1-liter, water-jacketed, pressure reactor that was fitted with a mechanical stirrer, a gas inlet tube, a gas vent port, a solids addition port, and a thermocouple well. The gases, nitrogen and ethylene, were passed through molecular sieve columns (Linde 4A). The solvents, polymerization-grade hexane and cyclohexane, were passed through molecular sieve columns (Linde 4A) and were purged wtih nitrogen prior to being forced under nitrogen pressure into the reactor. Before each polymerization, the reactor was heated at 100° C. with a slow nitrogen purge for at least 1 hour.

EXAMPLES 1 to 5

Table I summarizes five examples in which ethylene was polymerized in a slurry process, using a supported activated chromyl chloride catalyst. In each of these examples, the reactor was charged with 500 ml. of hexane, 0.4 g. of MSID silica (dried at 200° C.) and a benezene solution of the chromyl chloride. After 15

EXAMPLES 6 TO 8

At a higher reaction temperatures (i.e., under solution process conditions), supported activated chromyl chloride is an excellent catalyst for the production of polyethylene waxes. Using diethylaluminum ethoxide as the cocatalyst, the wax that is obtained has a surprisingly high vinyl content, which will facilitate subsequent reactions to make emulsifiable derivates. Table II summarizes three examples in which ethylene was polymerized under solution process conditions at temperatures ranging from 144° C. to 150° C. using 300 p.s.i.g. of ethylene. In each of these examples the supported activated chromyl chloride catalyst was prepared in 500 ml. of hexane using 0.4 g. of MSID silica (previously dried at 200° C.)

TABLE II.—CHROMYL CHLORIDE CATALYZED POLYMERIZATION OF ETHYLENE VIA A SOLUTION PROCESS

| Example No. | $CrO_2Cl_2$ (mmoles) | $Et_3Al$ (mmoles) | $Et_2AlOEt$ (mmoles) | Temp. (°C.) | Yield (g./hr.) | Percent | Melt index 1P | Melt index 10P |
|---|---|---|---|---|---|---|---|---|
| 6 | 0.0173 | 0.066 | 0.120 | 144 | 43/1.5 | 0.45 | 360 | |
| 7 | 0.0173 | | 0.18 | 144 | 20.5/1.5 | 0.62 | 630 | |
| 8 | 0.0161 | | 0.264 | 150 | 22.7/2 | 0.53 | | |

EXAMPLES 9 TO 12

Table III summarizes four examples in which ethylene was polymerized using different types of supports for the chromyl chloride catalyst. In each of these examples, the polymerization was conducted under slurry process conditions as indicated. The results of these examples show that various types of inorganic materials may be used as catalyst supports in accordance with the invention. All of the supports are more fully described in Davison Chemical Co. Technical Bulletin, L-401-964.

TABLE III[1].—THE EFFECT OF VARIOUS SUPPORTS

| Example No. | Support | $CrO_2Cl_2$ (mmoles) | $Et_3Al$ (mmoles) | $Et_2AlOEt$ (mmoles) | Temp. (° C.) | Yield (g./hr) | Melt index 1P | Melt index 10P |
|---|---|---|---|---|---|---|---|---|
| 9 | MS-silica [2] | 0.0173 | 0.066 | 0.120 | 90 | 160/1.5 | N.F. | 0.76 |
| 10 | MSID-silica [2] | 0.173 | 0.066 | 0.120 | 91 | 74/1.5 | N.F. | 3.6 |
| 11 | $SiO_2.Al_2O_3$ [3] | 0.173 | 0.066 | 0.120 | 87 | 41/1.5 | N.F. | 0.3 |
| 12 | MS-silica [2] | 0.171 | | 0.180 | 90 | 110/1.5 | N.F. | 0.90 |

[1] Slurry process, 500 ml. hexane, 0.4 g. support, 300 p.s.i.g. ethylene.
[2] Silica dried at 500° C.
[3] $SiO_2.Al_2O_3$ ratio 87/13 and dried at 200° C.

EXAMPLES 13 TO 18

Table IV summarizes six examples in which ethylene and propylene were copolymerized using the supported activated chromyl chloride catalyst under various conditions to form ethylene/propylene copolymers having a wide range of melt indices. In each of these examples, the polymerization reaction was carried out in a 5-gallon autoclave using slurry conditions. In each example, the catalyst was prepared in situ in the autoclave by adsorbing 12.8 ml. (0.158 mmole) of chromyl chloride on 4.2 g. of the particular catalyst support and then reducing the chromyl chloride with 2.6 mmole of diethylaluminum ethoxide, using a total of 6.5 kg. of n-hexane as solvent. After the catalyst was formed, the polymerization reaction was carried out under the conditions indicated on Table IV.

erization reaction is conducted in the presence of from about 0.001 to about 10 moles of hydrogen per mole of ethylene.

8. The process according to claim 5, in which the inorganic support is characterized by a surface area in the range from about 50 to about 1000 square meters per gram and is selected from the group consisting of silica, alumina, and silica-alumina mixtures.

9. The process according to claim 5, in which the organoaluminum compound is a dialkyl aluminum alkoxide.

10. The process according to claim 5, in which the

TABLE IV.—COPOLYMERIZATION OF ETHYLENE AND PROPYLENE

| Example No. | Silica type | Act. temp., °C. | Pressure hydrogen, p.s.i.g. | Pressure C₃H₆, p.s.i.g. | Pressure C₂H₄, p.s.i.g. | Reaction temp., °C. | Time, hrs. | Yield, gms. | Melt index 1P | Melt index 10P | $[\eta]$ dl./g. | Propylene in copolymer[1] wt. percent | Cyclohexane extractables percent |
|---|---|---|---|---|---|---|---|---|---|---|---|---|---|
| 13 | M.S. gel | 500 | | 30 | 200 | 88 | 2.75 | 3900 | 0.18 | 19.1 | 3.62 | 1.91 | 23.2 |
| 14 | M.S. gel | 500 | | 30 | 200 | 93 | 3.0 | 3683 | 0.24 | 24.1 | 3.79 | 3.2 | 20.0 |
| 15 | M.S. gel | 500 | 50 | 25 | 300 | 93 | 2.0 | 3249 | 5 37 | 352 | 1.65 | 2.6 | 17.3 |
| 16 | M.S. gel | 500 | 65 | 20 | 300 | 88 | 2.0 | 3159 | 3.81 | 258 | 1.76 | 2.7 | 18.0 |
| 17 | I.D. gel | 300 | | | 300 | 95 | 3.0 | 4608 | 0.018 | 4.28 | 5.53 | | 7.1 |
| 18 | I.D. gel | 300 | | 30 | 300 | 87 | 3.0 | 4793 | 6.14 | 452 | 1.82 | 2.75 | 27.2 |

[1] Determined by infrared measurements.

We claim:

1. A process for the polymerization of ethylene which comprises contacting ethylene, at a temperature and at a pressure sufficient to initiate the polymerization reaction, with a catalytic amount of the reaction product of (a) chromyl chloride adsorbed on an insoluble, inorganic activated having a high surface area, and (b) an organoaluminium reducing compound having at least 1 hydrocarbyl group and not more than 2 oxyhydrocarbyl groups attached to the aluminum atom in an amount sufficient to reduce at least a portion of the chromium to a +2 valence state.

2. The process according to claim 1, in which ethylene is homopolymerized to a normally solid, high molecular weight polyethylene.

3. The process according to claim 1, in which a major amount of ethylene and a minor amount of at least one other α-olefin are interpolymerized to a normally solid, high molecular weight interpolymer of ethylene and the α-olefin.

4. The process according to claim 1, in which a major amount of ethylene and a minor amount of at least one diolefin are interpolymerized to a normally solid, crosslinkable interpolymer.

5. A process for the polymerization of ethylene which comprises contacting ethylene, at a temperature and at a pressure sufficient to initiate the polymerization reaction, with a catalytic amount of the reaction product of (a) chromyl chloride adsorbed on an insoluble, inorganic activated having a high surface area, and (b) an organoaluminum compound represented by the formula $R_xAl(OR)_y$, where $x$ and $y$ are integers from 1 to 2 inclusive and together total 3, and R, is a hydrocarbyl group containing from 1 to about 14 carbon atoms, to form a normally solid, high molecular weight ethylene polymer.

6. The process according to claim 5 in which the polymerization reaction is conducted at a temperature in the range from about 30° C. to about 200° C. and at a pressure in the range from about 20 p.s.i.g. to about 800 p.s.i.g.

7. The process according to claim 5 in which the polympolymerization reaction is conducted in an inert organic medium for the polymerization.

11. The process according to claim 10, in which the polymerization is conducted at a temperature above the solution temperature of the polymer in the inert organic medium.

12. The process according to claim 10, in which the polymerization is conducted at a temperature below the solution temperature of the polymer in the inert organic medium.

13. A catalyst for the polymerization of ethylene comprising the reaction product of (a) chromyl chloride adsorbed on an insoluble, inorganic activated having a high surface area, and (b) an organoaluminum compound having at least 1 and not more than 2 oxyhydrocarbyl groups attached to the aluminum atom.

14. A catalyst for the polymerization of ethylene comprising the reaction product of (a) chromyl chloride adsorbed on a activated silica having a surface area in the range from about 50 to about 1000 square meters per gram, and (b) an organoaluminum compound represented by the formula $R_xAl(OR)_y$, where $x$ and $y$ are integers from 1 to 2 inclusive and together total 3, and R is a hydrocarbyl group containing from 1 to about 14 carbon atoms.

15. A catalyst according to claim 14, in which the organoaluminum compound is a dialkyl aluminum alkoxide.

References Cited

UNITED STATES PATENTS

| | | | |
|---|---|---|---|
| 3,051,690 | 8/1962 | Vandenberg | 260—88.2 |
| 3,081,286 | 3/1963 | McKinnis | 260—93.7 |
| 3,324,095 | 6/1967 | Carrick et al. | 260—88.2 |
| 3,346,511 | 10/1967 | Hill | 252—455 |

JOSEPH L. SCHOFER, Primary Examiner

R. A. GAITHER, Assistant Examiner

U.S. Cl. X.R.

252—467; 260—85.3, 88.2, 94.9

UNITED STATES PATENT OFFICE
CERTIFICATE OF CORRECTION

Patent No. 3,535,297          Dated October 20, 1970

Inventor(s) Wayne L. Carrick et al.

It is certified that error appears in the above-identified patent and that said Letters Patent are hereby corrected as shown below:

Column 5, line 62, after "pressure" insert -- is --. Column 8, line 59, "diethylene" should read -- diethylhexene --; line 60, "compound" should read -- compounds --; same line 60, "on" should read -- in --; line 67, "hexadine, dicyclopentadine" should read -- hexadiene, dicyclopentadiene --. Column 10, line 15, "diethylalumnium" should read -- diethylaluminum --; line 28, "a" should be cancelled. Columns 9 and 10, in Table II the "7" of Example 7 should be inverted and "Percent" should read -- Percent Vinyl --. Columns 11 and 12, in Table IV the $C_2H_4$ pressure for Example 18 should read -- 200 --. Column 11, at each of lines 31 and 55, after "activated" insert -- support --; line 58, "R," should read -- R --. Column 12, line 37, after "activated" insert -- support --; Column 12, "References Cited" insert 3,085,084   4/1963    Gresham et al------260-94.9
    3,223,688  12/1965    Badin -------------260-88.7

Signed and sealed this 2nd day of March 1971.

(SEAL)
Attest:

EDWARD M. FLETCHER, JR.               WILLIAM E. SCHUYLER, JR.
Attesting Officer                        Commissioner of Patents